(12) United States Patent
Dreux et al.

(10) Patent No.: US 9,315,743 B2
(45) Date of Patent: Apr. 19, 2016

(54) PROCESS FOR MILD HYDROCRACKING OF HEAVY HYDROCARBON FRACTIONS WITH OPTIMIZED THERMAL INTEGRATION FOR THE PURPOSE OF REDUCING GREENHOUSE GAS EMISSIONS

(71) Applicant: IFP Energies nouvelles, Rueil-Malmaison (FR)

(72) Inventors: Heloise Dreux, Lyons (FR); Frederic Feugnet, Lyons (FR); Romina Digne, Lyons (FR); Mai Phuong Do, Courbevoie (FR)

(73) Assignee: IFP Energies nouvelles, Rueil-Malmaison (FR)

(*) Notice: Subject to any disclaimer, the term of this patent is extended or adjusted under 35 U.S.C. 154(b) by 183 days.

(21) Appl. No.: 14/108,661

(22) Filed: Dec. 17, 2013

(65) Prior Publication Data
US 2014/0174985 A1 Jun. 26, 2014

(30) Foreign Application Priority Data

Dec. 18, 2012 (FR) .................................... 12 03469

(51) Int. Cl.
*C10G 67/02* (2006.01)
*C10G 47/36* (2006.01)
*C10G 47/02* (2006.01)
*C10G 49/26* (2006.01)
*C10G 69/04* (2006.01)

(52) U.S. Cl.
CPC ................ *C10G 47/02* (2013.01); *C10G 47/36* (2013.01); *C10G 49/26* (2013.01); *C10G 69/04* (2013.01); *Y02P 30/10* (2015.11)

(58) Field of Classification Search
CPC ......... C10G 47/02; C10G 47/36; C10G 69/04
See application file for complete search history.

(56) References Cited

U.S. PATENT DOCUMENTS

| 3,402,121 | A | * | 9/1968 | Hallman .......................... 208/59 |
| 4,940,529 | A | | 7/1990 | Beaton et al. |
| 2011/0147270 | A1 | * | 6/2011 | Goldstein et al. ............. 208/134 |

OTHER PUBLICATIONS

Search Report for FR1203469 dated Apr. 22, 2013.
Zhang, B. J. et al., "Simultaneous optimization of energy and materials based on heat exchanger network simulation for diesel hydrotreating units," Chemical Engineering Research and Design, 2010, vol. 88, pp. 513-519.

* cited by examiner

*Primary Examiner* — Brian McCaig
(74) *Attorney, Agent, or Firm* — Millen, White Zelano & Branigan, P.C.

(57) ABSTRACT

This invention describes a process for mild hydrocracking of heavy hydrocarbon fractions of the vacuum distillate type or the deasphalted oil type with optimized thermal integration for the purpose of reducing greenhouse gas emissions.

10 Claims, 2 Drawing Sheets

PROCESS FOR MILD HYDROCRACKING OF HEAVY HYDROCARBON FRACTIONS WITH OPTIMIZED THERMAL INTEGRATION FOR THE PURPOSE OF REDUCING GREENHOUSE GAS EMISSIONS

FIELD OF THE INVENTION

The invention relates to the field of soft hydrocracking of hydrocarbons (mild hydrocracking, in English). The invention consists in optimizing the thermal integrations between the hot and cold streams of the unit so as to reduce the consumption of hot and cold utilities, and, as a result, the greenhouse gas (GHG) emissions.

EXAMINATION OF THE PRIOR ART

Figure 1:
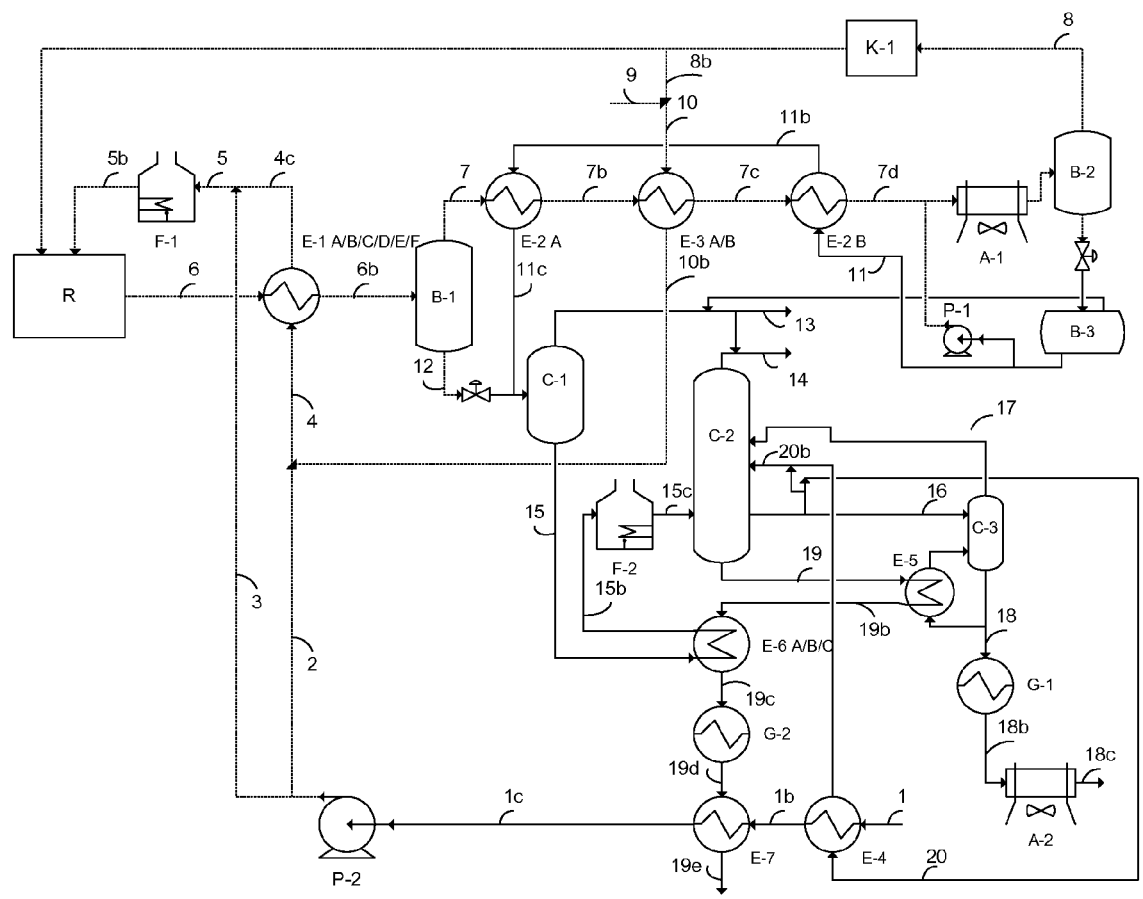

The prior art is shown by the diagram of FIG. 1 that will be described in detail in the paragraph "detailed description of the invention."

SUMMARY DESCRIPTION OF THE FIGURES

Figure 2:
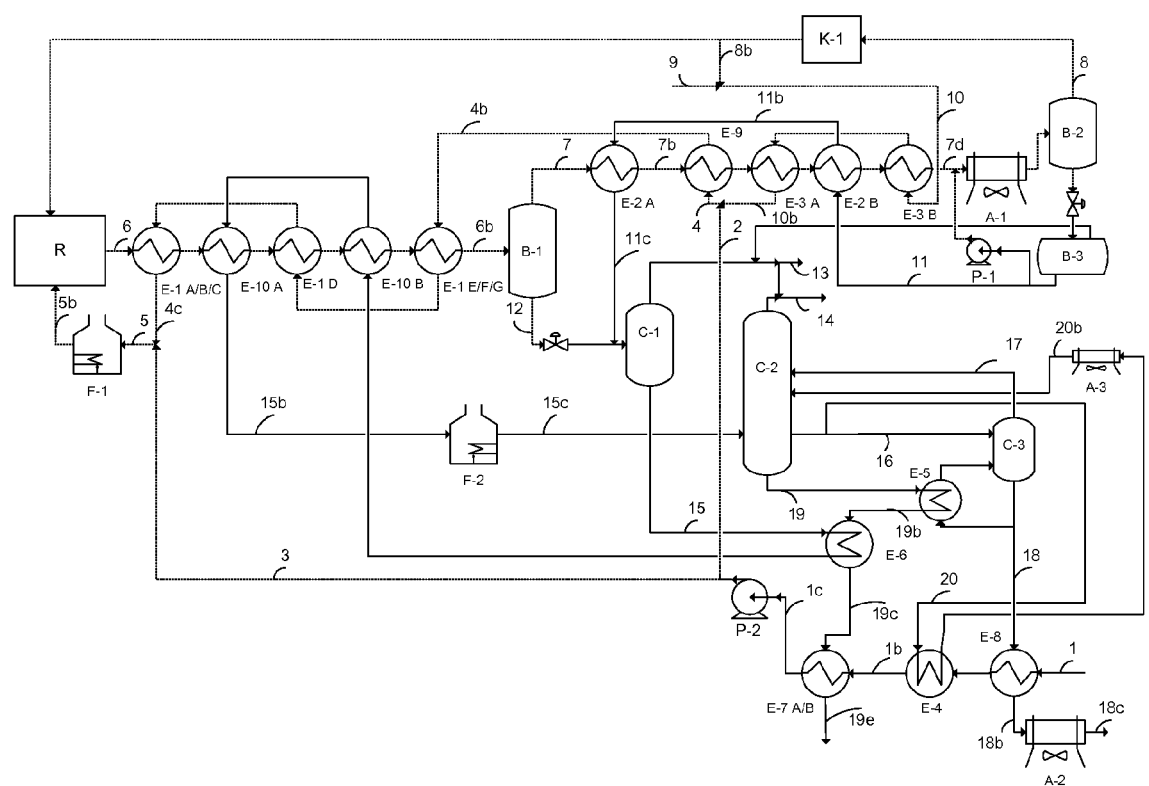

FIG. 1 shows the thermal integrations of a mild hydrocracking process according to the prior art.
FIG. 2 shows the new thermal integrations of the mild hydrocracking process according to the invention.

SUMMARY DESCRIPTION OF THE INVENTION

This invention describes a process for mild hydrocracking of a fraction of the type vacuum gas oil (VGO), vacuum distillate (DSV), or deasphalted oil (DAO) for the purpose of constituting the feedstock of a catalytic cracking unit, comprising:
 A mild hydrocracking zone R,
 A high-pressure hot separator tank B-1, whose feedstock constitutes the effluent obtained from R,
 A high-pressure cold separator tank B-2, whose feedstock constitutes the gas stream obtained from B-1,
 A low-pressure cold separator tank B-3, whose feedstock is the liquid stream obtained from B-2,
 A zone K-1 for washing with an amine and for compression of the gaseous effluent obtained from B-2, called recycled hydrogen,
 A pump P-2 compressing the VGO feedstock before mixing with the recycled hydrogen obtained from K-1 and the addition of hydrogen,
 A stripper C-1 of the liquid streams obtained from B-1 and B-3, whose bottom product constitutes the feedstock of the fractionator C-2,
 A fractionator C-2, separating the naphtha, the diesel and the residue, and comprising a diesel-circulating reflux,
 A diesel stripper C-3, stripping the diesel obtained from C-2,
 A furnace F-1 heating the feedstock of the mild hydrocracking zone R,
 A furnace F-2 heating the feedstock of the fractionator C-2,
with said process comprising optimized heat exchanges between different streams at different levels of said process for the purpose of ultimately obtaining a substantial reduction in the capacities of the furnaces F-1, F-2 used in the process.

It should be noted that in the process according to the invention, the power of the furnaces, i.e., the furnace denoted F-1 that is located upstream from the hydrocracking reactor (s) R and the furnace F-2 that is located upstream from the fractionator C-2, varies over the cycle of the process based on the gradual deactivation of the catalyst that is used in the hydrocracking reactors. In contrast, the sum of the powers of the two furnaces F-1 and F-2 varies fairly little during the cycle period of the process.

More specifically, this invention can be defined as a process for mild hydrocracking of a fraction of the VGO, DSV or DAO type for the purpose of constituting the feedstock of a catalytic cracking unit, with the process comprising optimized heat exchanges between different streams at different levels of said process, or specifically:
 a) At the exchange train of the heating of the low-pressure feedstock, by exchange:
  In E-8 with the stripped diesel obtained from C-3,
  Then, in E-4 with the diesel-circulating reflux,
  Then, in E-7 with the bottom of the fractionator, with E-7 being able to consist of several calendars in a series (then denoted E-7 A/B),
 b) At the exchange train of the cooling of the gaseous effluent obtained from B-1, by exchange:
  In E-2 A and E-2 B with the liquid obtained from B-3,
  In E-9 with the high-pressure feedstock mixed with a part of the recycled hydrogen and the addition of hydrogen,
  In E-3 A and E-3 B with the mixture of the addition of hydrogen and a part of the recycled hydrogen,
  In the following order: E-2 A, E-9, E-3 A, E-2 B, and then E-3 B,
 c) At the exchange train of the cooling of the effluent of the mild hydrocracking zone R, by exchange:
  In E-1 with the high-pressure feedstock of R, with E-1 consisting of several calendars,
  In E-10 with the feedstock of the fractionator C-2, with E-10 being able to consist of several calendars and the calendars being able to be located between calendars of E-1,
 d) At the exchange train of the cooling of the bottom of the fractionator C-2, by exchange:
  First in E-5 with the diesel for reboiling the diesel stripper C-3,
  Then in E-6 with the feedstock of the fractionator C-2,
  And finally in E-7 with the feedstock of the process, with E-7 being able to consist of several calendars in a series,
process characterized in that all of the preceding heat exchanges make it possible to reduce the cumulative power of furnaces F-1 and F-2 in a factor of between 0.35 and 0.60, preferably between 0.40 and 0.55.

The ultimate result is that the cumulative power of furnaces F-1 and F-2 varies during the cycle of the process between 30 and 60 kcal per kg of feedstock, preferably between 35 and 50 kcal per kg of feedstock.

DETAILED DESCRIPTION OF THE INVENTION

To understand the invention, it is first necessary to describe the scheme of thermal integrations according to the mild hydrocracking process of the prior art shown in FIG. 1. To facilitate understanding, the elements that are common to the scheme according to the prior art and to the scheme according to this invention retain the same name and the same symbol in FIG. 1 (according to the prior art) and FIG. 2 (according to the invention). The new elements are introduced with different letters.

The feedstock of the unit (stream 1) can be a vacuum gas oil (VGO), a vacuum distillate (DSV), or else a deasphalted oil (DAO). Hereinafter, without being limiting, the example of a VGO feedstock will be used. In a general manner, the term feedstock of the process according to the invention will be used.

The VGO (stream 1) reaches a temperature of approximately 90° C. and low pressure at the inlet of the unit.

The VGO is heated to a temperature that is generally between 300° C. and 450° C., and preferably between 350° C. and 400° C. (414° C., in the example, stream 5b), corresponding to the inlet temperature in the reaction zone.

The heating of the VGO is usually done in a first step at low pressure:
  Because of the diesel-circulating reflux (stream 20) by means of the exchanger E-4. The stream of VGO (1b) exits therefrom,
  And then because of the effluent from the bottom of the fractionator C-2 (stream 19d) by means of the exchanger E-7. The stream of VGO (1c) exits therefrom.

Next, the VGO is compressed by a pump P-2 and mixed with a very hydrogen-rich stream (stream 10b), and then it is heated, usually at high pressure:
  Because of the reaction effluent (stream 6) by means of the exchanger E-1 that consists of several calendars in a series (6, in the example, more generally between 4 and 10), with the calendars being called A to F in FIG. 1 for indicating that they are 6 in number. The stream of VGO (4c) exits therefrom.
  And finally because of the furnace F-1 from which the stream of VGO (stream 5b) exits at the temperature required for the inlet in the hydrocracking reactor (R).

After compression, a fraction of the VGO is short-circuited for the flexibility of the process (stream 3).

The reaction effluent (stream 6) is cooled by heat exchange with the reaction feedstock by means of the exchanger E-1 up to a temperature of approximately 280° C. (more generally between 200 and 300° C.).

The gaseous phase of the reaction effluent at 280° C. (stream 7), rich in hydrogen, is separated from the liquid phase (stream 12) in a high-pressure separator tank B-1.

Next, this gaseous phase (stream 7) is cooled and partially condensed:
  By thermal exchange with the hydrocarbon effluent of the low-pressure cold tank B-3 (stream 11) in the exchangers E-2 A and E-2 B,
  And by heat exchange with the stream 10 in the exchanger E-3 consisting of two calendars in a series (E-3 A and E-3 B), with the stream 10 being the mixture of the hydrogen addition (stream 9) with a part of the recycled hydrogen (stream 8b),
  And finally in a cooling tower A-1 up to a temperature of approximately 57° C. (57° C. in the example, more generally between 30° C. and 80° C.).

The stream exiting from the cooling tower A-1 is separated into two streams in the high-pressure cold tank B-2:
  A gas stream (stream 8) that is very rich in hydrogen, which is washed with an amine and then compressed in the zone K-1 before being mixed again with the VGO feedstock,
  A liquid stream that is first expanded and then sent to the low-pressure cold tank B-3.

The liquid hydrocarbon stream that is obtained from B-3 (stream 11) is heated by means of the exchangers E-2 A and E-2 B, and then mixed with the liquid phase of the high-pressure hot tank B-1 (stream 12).

The recycled hydrogen that is obtained from K-1 is partially recycled toward the hydrocracking reactor(s) (R) and partially mixed with the hydrogen addition (stream 9) for forming the stream 10. The stream 10 is heated by the stream 7b by means of the exchanger E-3 that consists of two calendars in a series. Next, the stream 10b, very rich in hydrogen, is mixed with the stream 2 (VGO) for forming the stream 4.

The mixture of streams 11c and 12 is stripped with the steam in the stripper C-1.

A fraction that is rich in light gases is separated at the top of C-1 (stream 13). The stripped stream (stream 15) is sent to the fractionator C-2 after having been heated:
  By the bottom of the fractionator C-2 (stream 19b) by means of the exchanger E-6 that generally consists of 3 calendars in a series,
  And then in a furnace F-2 to a temperature of approximately 370° C. (more generally of between 350 and 400° C.).

The gasoline fractions that are obtained at the top of C-1 and C-2 are mixed for forming the stream 14.

The stream 20, diesel-circulating reflux, is cooled by means of the exchanger E-4, by heat exchange with the VGO feedstock of the unit (stream 1).

The diesel that is drawn off from the fractionator C-2 (stream 16) is stripped in a so-called diesel stripper column C-3, reboiled by heat exchange with the bottom of the fractionator C-2 (stream 19) by means of the exchanger E-5.

The stripped diesel (stream 18) is cooled in the low-pressure steam generator exchanger G-1, and then it is cooled by the cooling tower A-2 to a temperature of approximately 65° C. (more generally between 50 and 70° C.).

The bottom of the fractionator C-2, also called residue, is cooled:
  By heat exchange in E-5 with the diesel stream,
  By heat exchange in E-6 with the stream 15,
  Because of the exchanger G-2 generating medium-pressure steam,
  And finally by heat exchange with the feedstock (stream 1b) in the exchanger E-7.

FIG. 2 according to this invention can be described in the following manner:

In the process according to the invention, the heating of the VGO (stream 1) is done:
  First because of the stripped diesel (stream 18) by means of the new exchanger E-8,
  Then because of the diesel-circulating reflux (stream 20) by means of the exchanger E-4,
  And then because of the effluent from the bottom of the fractionator C-2 (stream 19c) by means of 2 exchangers in a series E-7 A and E-7 B.

These changes relative to the prior art make it possible to bring the stream 1c to a higher temperature (232° C. according to the invention instead of 170° C. in the prior art).

The new cooling tower A-3 is necessary for the flexibility of the unit. In the prior art, a part of the diesel-circulating reflux was short-circuited for obtaining flexibility.

The stream 18b in the process according to the invention is found again at a temperature that is lower than the one in the state of the art (136° C. according to the invention instead of 184° C. in the prior art). As a result, the thermal power of the cooling tower A-2 is considerably reduced in the process according to the invention.

The stream 1c is compressed and then separated into two streams (streams 2 and 3) in a manner that is identical to the prior art.

The stream 2 is then mixed with hydrogen (stream 10b), and then the resulting mixture is heated by the stream 7b by means of the new exchanger E-9.

In addition, also for improving the thermal integration, the exchanger E-2 B was moved between the two calendars E-3 A and E-3 B.

The stream 7d in the process according to the invention is found again at a temperature that is lower than the one in the state of the art (184° C. according to the invention instead of 197° C. in the prior art). As a result, the thermal power of the cooling tower A-1 is reduced in the process according to the invention.

It is not possible to greatly reduce the thermal power of the furnace F-1 for different reasons:
- An increase in temperature of a minimum of 15° C. is recommended in the furnace,
- The stream 3 (short-circuit of VGO) is necessary for the flexibility of the unit.

By adding a new calendar to the exchanger E-1 (7 calendars instead of 6 in the example), the thermal power of the furnace F-1 is slightly reduced in the process according to the invention.

In the process according to the invention, the stream 15 (bottom of the stripper C-1) is first heated with the bottom of the fractionator C-2 (stream 19b) in the exchanger E-6, but in a single calendar instead of the three in the prior art, then with the reaction effluent by means of two new calendars E-10 A and E-10 B. This makes it possible to have a stream at the inlet of the furnace F-2 (stream 15b) at a much higher temperature (355° C. according to the invention instead of 304° C. in the prior art).

The power of the furnace F-2 is therefore very greatly reduced in the process according to the invention. As for the furnace F-1, a temperature increase of a minimum of 15° C. is recommended in the furnace F-2.

"Amine" Option

If the amine that is necessary for removing $H_2S$ in the recycled hydrogen (stream 8) is available at a temperature that is lower than the temperature of the process, it is possible to heat the amine with the diesel at the outlet of exchanger E-8 (stream 18b). The temperature of the fluid for heating the amine should not be too high so as not to degrade the amine. This is the case of the stream 18b in the process according to the invention. This exchange makes it possible to reduce the electrical consumption of the cooling tower A-2 and the consumption of low-pressure steam for heating the amine.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 12/03.469, filed Dec. 18, 2012, are incorporated by reference herein.

EXAMPLE ACCORDING TO THE INVENTION

A mild hydrocracking unit consists of 3 reactors (7 catalytic beds).
Capacity: 442 t/h (70,000 BPSD)
Temperature of the hydrocracking reactors: 420° C. (WABT, mean temperature of each bed)
Pressure of the reactors: 101 to 129 bars effective (1 bar=$10^5$ Pascal)
LHSV=0.313 $h^{-1}$ Table 1 below indicates the primary temperatures of the mild hydrocracking unit according to the prior art and according to the invention.

The numbers of the streams are those of FIG. 1 (prior art) and FIG. 2 (according to the invention).

TABLE 1

Temperature of the Primary Streams

| | Temperature (° C.) | |
|---|---|---|
| Stream | According to the Prior Art | According to the Invention |
| 1 | | 90 |
| 2 and 3 | 170 | 232 |
| 4 | 195 | 225 |
| 4b | — | 243 |
| 5b | | 414 |
| 6 | | 422 |
| 6b, 7 and 12 | | 280 |
| 7d | 197 | 184 |
| 8 | | 57 |
| 10 | | 124 |
| 10b | 248 | 223 |
| 11c | | 266 |
| 15b | 304 | 355 |
| 15c | | 370 |
| 20 | | 236 |
| 20b | | 175 |
| 18 | | 270 |
| 18b | 184 | 136 |
| 18c | | 65 |
| 19 | | 336 |
| 19e | 196 | 206 |

Table 2 below indicates the powers of exchanges with utilities of the mild hydrocracking unit according to the prior art and according to the invention.

TABLE 2

Power of Exchanges with Utilities

| Thermal Power (MW) | According to the Prior Art | According to the Invention | Difference (Invention - Prior Art) |
|---|---|---|---|
| Furnace F-1 | 14.1 | 12.2 | −1.9 |
| Furnace F-2 | 24.8 | 6.9 | −17.9 |
| Furnaces F-1 + F-2 | 38.9 | 19.1 | −19.8 |
| Cooling Tower A-1 | 47.8 | 43.8 | −4.0 |
| Cooling Tower A-2 | 8.8 | 5.1 | −3.7 |
| Cooling Tower A-3 | — | 2.0 | +2.0 |
| Cooling Tower A-1 + A-2 + A-3 | 56.6 | 50.9 | −5.7 |
| Steam Generator G-1 | 7.4 | — | −7.4 |
| Steam Generator G-2 | 9.0 | — | −9.0 |

The process according to the invention makes it possible to very greatly reduce the power of the furnace F-2 but also the power of the furnace F-1, and the overall power of the cooling towers.

The overall thermal power of the furnaces (F-1+F-2) is reduced by half in the process according to the invention.

In addition, the process according to the invention no longer generates low-pressure and medium-pressure steam, which is already in excess in the refinery. The steam generators G-1 and G-2 of the prior art are eliminated.

Another advantage of the invention is the increase in the temperature of the stream 19e by several degrees Celsius (10° C. in the example). In the process according to the invention, the stream 19e has a temperature that is closer to the temperature that is necessary for entering the FCC riser.

Thus, the stream 19e will require less energy for bringing it to the desired temperature in the FCC unit (gain of 2.0 MW of energy for a temperature of 210° C. at the inlet of the riser in the example).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for mild hydrocracking of a fraction of the VGO type for the purpose of constituting the feedstock of a catalytic cracking unit, comprising:
    hydrocracking a VGO stream in a zone R wherein the VGO stream has been heated by a diesel-circulating reflux and a furnace F-1,
    separating a hydrogen rich gaseous phase and a liquid stream from the reaction effluent of zone R in a high-pressure hot separator tank B-1,
    separating a hydrogen rich gas stream and a liquid stream from the hydrogen rich gaseous phase stream from B-1 which has been cooled, wherein the separation occurs in a high-pressure cold separator tank B-2,
    storing the liquid stream from B-2 which has been compressed, wherein the storage occurs in a low-pressure cold separator tank B-3,
    washing the hydrogen rich stream with an amine and compressing the washed rich hydrogen stream, wherein both washing and compressing occur in a zone K-1,
    compressing a VGO feedstock and mixing the compressed VGO feedstock with the washed and compressed hydrogen rich stream obtained from K-1,
    stripping a mixture of the liquid streams obtained from B-1 and B-3 in a stripper C-1,
    separating naphtha, diesel, and residue from the stripped stream obtained from C-1, where the separating occurs in a fractionator C-2 wherein the striped stream obtained from C-1 has been heated by a furnace F-2,
    stripping the diesel obtained from C-2, wherein said stripping occurs in a second stripper C-3,
    wherein the VGO stream is heated in exchanger E-8 with the stripped diesel obtained from C-3, in exchanger E-4 with the diesel-circulating reflux, and in exchanger train E-7 with the bottom of the fractionator C2, wherein train E-7 comprises at least one calendar, and/or
    the hydrogen rich gaseous phase stream from B-1 is cooled in exchanger E-2 A and exchanger E-2 B with the liquid stream from B-3, in exchanger E-9 with a high-pressure feedstock mixed with hydrogen, and in E-3 A and E-3 B with a mixture of addition hydrogen and a part of a recycled hydrogen stream, where the heat exchange occurs in the following order: E-2 A, E-9, E-3 A, E-2 B, and E-3 B, and/or
    the effluent of zone R is cooled in exchanger train E-1 with the VGO feedstock, wherein train E-1 comprises at least one calendar; and in exchanger train E-10 with the feedstock of the fractionator C-2, wherein exchanger train E-10 comprises at least one calendar and wherein the calendars are located between calendars of exchanger train E-1, and/or
    the bottom of the fractionator C-2 is cooled by exchanger E-5 with the diesel for reboiling the diesel stripper C-3 and the exchanger E-6 with the feedstock of the fractionator C-2.

2. The process of claim 1, wherein the cumulative power of the furnaces F-1 and F-2 during the operating cycle of said process varies between 30 and 60 kcal per kg of feedstock.

3. The process of claim 2 wherein, the cumulative power of the furnaces F-1 and F-2 during the operating cycle of said process varies between 35 and 50 kcal per kg of feedstock.

4. The process of claim 1 wherein the VGO stream is heated in exchanger E-8 with the stripped diesel obtained from C-3, in exchanger E-4 with the diesel-circulating reflux, and in exchanger train E-7 with the bottom of the fractionator C2, wherein train E-7 comprises at least one calendar.

5. The process of claim 1 wherein the hydrogen rich gaseous phase stream from B-1 is cooled in exchanger E-2 A and exchanger E-2 B with the liquid stream from B-3, in exchanger E-9 with a high-pressure feedstock mixed with hydrogen, and in exchangers E-3 A and E-3 B with a mixture of addition hydrogen and a part of a recycled hydrogen stream, where the heat exchange occurs in the following order: E-2 A, E-9, E-3 A, E-2 B, and E-3 B.

6. The process of claim 1 wherein the effluent of zone R is cooled in exchanger train E-1 with the VGO feedstock, wherein train E-1 comprises at least one calendar; and in exchanger train E-10 with the feedstock of the fractionator C-2, wherein exchanger train E-10 comprises at least one calendar and wherein the calendars are located between the calendars of exchanger train E-1.

7. The process of claim 1 wherein the bottom of the fractionator C-2 is cooled by exchanger E-5 with the diesel for reboiling the diesel stripper C-3 and the exchanger E-6 with the feedstock of the fractionator C-2.

8. The process of claim 1 wherein the VGO stream is heated in exchanger E-8 with the stripped diesel obtained from C-3, in exchanger E-4 with the diesel-circulating reflux, and in exchanger E-7 with the bottom of the fractionator C2, wherein E-7 comprises at least one calendar,
    the hydrogen rich gaseous phase stream from B-1 is cooled in exchanger E-2 A and exchanger E-2 B with the liquid stream from B-3, in exchanger E-9 with a high-pressure feedstock mixed with hydrogen, and in E-3 A and E-3 B with a mixture of addition hydrogen and a part of a recycled hydrogen stream, where the heat exchange occurs in the following order: E-2 A, E-9, E-3 A, E-2 B, and E-3 B,
    the effluent of zone R is cooled in exchanger E-1 with the VGO feedstock, wherein E-1 comprises at least one calendar; and in exchanger E-10 with the feedstock of the fractionator C-2, wherein exchanger E-10 comprises at least one calendar and wherein the calendars are located between calendars of exchanger E-1, and
    the bottom of the fractionator C-2 is cooled by exchanger E-5 with the diesel for reboiling the diesel stripper C-3 and the exchanger E-6 with the feedstock of the fractionator C-2.

9. The process of claim 8, wherein the heat exchanges are operated such that they reduce the cumulative power of the furnaces F-1 and F-2 by a factor of 0.4 to 0.55 relative to the configuration shown in FIG. 1.

10. The process of claim 8 wherein the heat exchanges are operated such that they result in reducing the cumulative power of the furnaces F-1 and F-2 by a factor of 0.35 to 0.6 relative to the configuration shown in FIG. 1.

* * * * *